3,402,067
METHOD FOR DEPOSITING ALUMINUM FILM
Robert C. Langley, Millington, N.J., assignor to Engelhard Industries, Inc., Newark, N.J., a corporation of Delaware
No Drawing. Filed Sept. 24, 1965, Ser. No. 490,115
3 Claims. (Cl. 117—119)

This invention relates to a method for coating surfaces with aluminum and, more particularly, to a method involving depositing upon a surface an adherent aluminum film formed from an aluminum-containing organic compound.

Various methods have been used to obtain pure aluminum films. For example, cladding, vapor deposition, sputtering, flame spraying and electroplating methods are known. These methods are not entirely satisfactory, e.g. because of the cost and complexity of the equipment employed, as well as the fact that in certain cases, e.g. cladding and flame spraying, films are deposited that are too thick for many applications.

It is also known to deposit aluminum films by decomposition of organic aluminum compounds, e.g. trialkyl aluminum compounds. Such compounds may be decomposed in the vapor phase, but the use of such techniques is limited due to the toxic, pyrophoric and unstable nature of the compounds. Additionally, they react with air and water vapor resulting in oxide formation which detracts from the electrical characteristics of the resultant metallic film.

Attempts have been made to deposit aluminum from aluminum alkyls dissolved in solvents, e.g. in paraffin wax as disclosed in U.S. Patent 3,041,197. Such a solvent purportedly stabilizes the compounds so that they may be applied in an oxygen- or moisture-containing atmosphere. In fact, solutions of alkyl aluminum compounds in organic solvents are not sufficiently stable to the action of air or moisture and, additionally, do not deposit a metallic film unless applied to a pre-heated substrate.

In accordance with the present invention, thin, continuous, adherent metallic aluminum coatings are prepared by thermal decomposition of a stabilized aluminum compound. Stabilized compounds, as used herein, refer to compounds which are non-reactive with air or water vapor under application conditions and are essentially non-inflammable and non-volatile under film-forming conditions. They decompose from liquid or solid phase at elevated temperatures to form thin, adherent films. An important feature of these stabilized compounds is that they can be applied to a substrate in a non-protective atmosphere, e.g. in air. Development in a protective atmosphere at elevated temperatures gives films in the form of aluminum. In an oxidizing atmosphere alumina films are formed.

The stabilized aluminum hydrocarbon compounds are formed by reacting a hydrocarbon aluminum compound with an organic electron donor such as an amine, thioether, organic sulfide, and olefin. The hydrocarbon aluminum compound employed in accordance with this invention has at least one carbon-aluminum bond, e.g. trialkyl aluminum, dialkyl aluminum hydride, triaryl aluminum, and the like. The aluminum compound is reacted with an electron donor compound to provide a coordination complex having the structure $$RR^1R^2Al \cdot R^3$$ 

wherein

R is an alkyl or aryl
$R^1$ and $R^2$ are alkyl, aryl or hydrogen
$R^3$ is an organic electron donor such as amine, mercaptan, thioether, organic sulfide, and olefin.

The coordination compound is formed by mixing a solution of the organic aluminum compound with at least an equivalent weight of the organic electron donor, preferably in a solvent. Excess of the electron donor may be employed. Generally upon mixing the compounds, heat is given off indicating reaction to form the coordination compound. Preferably, the resultant solution contains from 0.5 to 10% by weight aluminum.

The solution of organic aluminum coordination compound is stable in air and, upon application to a substrate and heating in an inert atmosphere, e.g. $H_2$ or $N_2$, to a temperature of 900–1000° C., deposits a bright adherent metallic aluminum film. Among the electron donor compounds which have successfully been employed in the practice of the invention are menthane diamine, lauryl mercaptan, t-dodecyl mercaptan, n-butyl sulfide and octene-2.

Example 1.—Stabilization of tri-isohexyl aluminum with menthane diamine

A solution of 10 gm. menthane diamine* in 10 gm. toluene was prepared. A solution of tri-isohexyl aluminum in toluene, containing 25% by weight of the alkyl was stored under nitrogen pressure. The amine solution was swept with oxygen-free nitrogen to remove any dissolved oxygen. The aluminum solution was then added slowly under the liquid level of the amine solution under a blanket of nitrogen. There was slight heat during addition. When 10 grams of the aluminum solution had been added, the clear solution was stirred for several minutes by bubbling oxygen-free nitrogen through it. The solution then contained:

|  | Grams |
|---|---|
| Menthane diamine | 10.0 |
| Toluene | 10.0 |
| Tri-isohexyl aluminum in toluene (25% by weight) | 10.0 |
| Total | 30.0 |

The solution contained 8.33% tri-isohexyl aluminum, equivalent to 0.8% aluminum. The molecular weight of tri-isohexyl aluminum is 282; the molecular weight of menthane diamine is 270 and this compound has two functional groups so it is seen that the amine is present in considerable excess of equimolar. The solution was stable in air.

A few milliliters of this solution was poured into a ceramic boat and heated in hydrogen to 1000° C., with

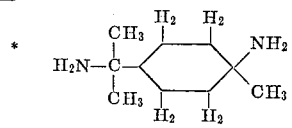

* a 30-minute soak at peak temperature. A highly-conductive aluminum film was formed.

Example 2.—Formation of Al-film from stabilized compounds

Using a similar procedure to that described in Example 1, a toluene solution was prepared of tri-isobutyl aluminum complexed with menthane diamine. The solution contained 1.78% aluminum. The solution was stable.

A few milliliters of the solutions were poured in two ceramic boats and then fired in $H_2$. One sample was fired at 900° C. and the other at 1000° C. and highly conductive aluminum deposits were found in the ceramic boats.

Example 3

Stable solutions of iso-butyl aluminum were formed with lauryl mercaptan, t-dodecyl mercaptan, n-butyl sulfide and octene-2 as follows:

Solution A

|  | Grams |
|---|---|
| Lauryl mercaptan | 2.02 |
| Toluene | 10.0 |
| Tri-isobutyl aluminum | 1.0 |
| Total | 13.02 |

Solution B

| t-Dodecyl mercaptan | 2.02 |
|---|---|
| Toluene | 10.0 |
| Tri-isobutyl aluminum | 0.92 |
| Total | 12.94 |

Solution C

| n-Butyl sulfide | 1.46 |
|---|---|
| Toluene | 10.0 |
| Tri-isobutyl aluminum | 1.5 |
| Total | 12.96 |

Solution D

| Octene-2 | 9.43 |
|---|---|
| Tri-isobutyl aluminum | 1.08 |
| Total | 10.51 |

These solutions did not react with air and were stable after five months with bottles opened frequently. After applying the solutions in air by brushing on a ceramic they are then heated in a nitrogen atmosphere to obtain an aluminum film.

What is claimed is:

1. A process for the deposition of aluminum on a surface which comprises coating the surface in a non-protective atmosphere with a solution of a stabilized hydrocarbon aluminum compound prepared by reacting a hydrocarbon aluminum compound having at least one carbon to aluminum bond with an electron donor compound selected from the group consisting of amines, mercaptans, thioethers, organic sulfides and olefins, and treating the coated surface in an inert atmosphere at an elevated temperature to decompose the stabilized hydrocarbon aluminum compound and to deposit an aluminum film on said surface.

2. The process of claim 1 wherein the hydrocarbon aluminum compound is tri-isohexyl aluminum and the electron donor compound is menthane diamine.

3. The process of claim 2 wherein the coated surface is treated at a temperature between about 900° C. and 1000° C. to decompose the stabilized hydrocarbon aluminum compound.

References Cited

UNITED STATES PATENTS

| 2,929,739 | 3/1960 | Breining et al. | 117—130 X |
| 3,041,197 | 6/1962 | Berger | 117—47 |
| 3,147,154 | 9/1964 | Cole et al. | 117—113 X |

ALFRED L. LEAVITT, *Primary Examiner.*

A. G. GOLIAN, *Assistant Examiner.*